United States Patent [19]

Klemchuk

[11] 3,860,558

[45] Jan. 14, 1975

[54] STABILIZED POLYAMIDE COMPOSITIONS

[75] Inventor: Peter Klemchuk, Yorktown Heights, N.Y.

[73] Assignee: Ciba-Geigy Corporation, Ardsley, N.Y.

[22] Filed: Dec. 7, 1970

[21] Appl. No.: 95,912

[52] U.S. Cl. ............... 260/45.8 N, 260/45.7 P, 260/45.75 R, 260/45.9 NC
[51] Int. Cl. ................... C08g 51/56, C08g 51/60
[58] Field of Search ..... 260/45.7 P, 45.8 N, 45.9 R, 260/45.9 NC, 45.75 R

[56] References Cited
UNITED STATES PATENTS

| | | | |
|---|---|---|---|
| 2,510,777 | 6/1950 | Gray | 260/45.7 |
| 3,435,065 | 3/1969 | Dexter et al. | 260/473 |
| 3,493,633 | 2/1970 | Lange | 260/857 |
| 3,533,986 | 10/1970 | Davy | 260/37 |
| 3,584,047 | 6/1971 | Dexter et al. | 260/559 |
| 3,595,829 | 7/1971 | Davy | 260/45.8 |

FOREIGN PATENTS OR APPLICATIONS 812,262   5/1969   Canada

OTHER PUBLICATIONS

Def. Publ., T872,009, Keith et al.

*Primary Examiner*—Donald E. Czaja
*Assistant Examiner*—R. A. White
*Attorney, Agent, or Firm*—Nestor W. Shust

[57] ABSTRACT

Heat stabilized synthetic polyamide compositions are prepared by incorporating therein a mixture of a phenolic antioxidant and metal hypophosphite. A typical embodiment includes polyamides which are stabilized with 1,2-bis[3-(3,5-di-t-butyl-4-hydroxyphenyl)propionamido]ethane and sodium hypophosphite.

10 Claims, No Drawings

STABILIZED POLYAMIDE COMPOSITIONS

DETAILED DESCRIPTION

This invention relates to synthetic polyamide compositions having improved oxidative stability. More specifically, it relates to a synthetic polyamide composition stabilized against oxidative and thermal deterioration which comprises a polyamide, from about 0.01 to about 0.25 weight percent of a metal hypophosphite wherein said metal is selected from the groups I*a*, I*a* or II*b* of the periodic table, and from about 0.01 to about 5 weight percent of a hindered phenolic compound having the formula:

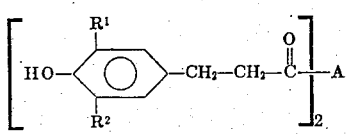   I wherein
R$^1$ and R$^2$ are lower alkyl of from 1 to 6 carbon atoms and
A is selected from the group consisting of

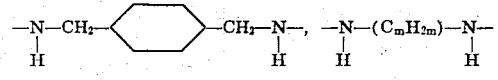

and

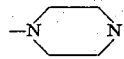

where *m* is a number from 2 to 8 and —(C$_m$H$_{2m}$)— is linear or cyclic; or

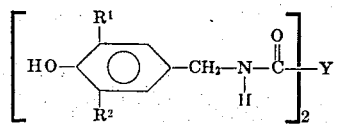   II wherein
R$^1$ and R$^2$ are as defined above and
y is alkylene from 1 to 10 carbon atoms or —C$_2$H$_4$—S—C$_2$H$_4$—.

Illustrative examples of lower alkyl groups which are represented by R$^1$ and R$^2$ are methyl, ethyl, propyl, isopropyl, t-butyl, pentyl and hexyl. The preferred groups are methyl and the branched alkyls such as tertiary butyl and isopropyl.

Illustrative examples of the metal from groups I*a*, II*a* and II*b* which can be used as the metal hypophosphite are lithium, sodium, potassium, barium, magnesium, calcium, strontium and zinc. The transition metal manganese can also be used. The preferred metal hypophosphites are sodium hypophosphite and potassium hypophosphite and sodium hypophosphite is the most preferred.

By synthetic polyamides is meant condensation polymers obtained by the polycondensation of amino carboxylic acids or of mixtures of diamines and dicarboxylic acids including interpolyamides obtained by the polycondensation of mixtures of different polyamide forming components. More particularly, are intended the class of polyamides known generally as nylons of which polyhexamethylene adipamide and polycaprolactam are familiar examples. Within this class are also included interpolyamides, that are obtained, for example, by the polycondensation of a mixture of hexamethylene diammoniumadipate with caprolactam.

This invention is useful for polyamides in all forms. Particularly preferred are those polyamides which may be obtained in fibrous form by melting, spinning the molten material and drawing the resultant filaments in a known manner. Particularly suitable polyamides of our invention are those in which the polyamide is polyhexamethylene adipamide.

The phenolic antioxidants and the hypophosphite compounds can be incorporated into the polyamide before, during or after the polycondensation step. Thus the phenolic antioxidant and the hypophosphite can be added to the polymer forming ingredients before the polycondensation step or during the polycondensation process and the reaction completed by heating. The phenolic antioxidant and the hypophosphite compound can also be added to the already formed polyamide by adding the phenolic antioxidant and hypophosphite mixture to the molten polyamide or alternatively they can be mixed with the solid polyamide or the solid polyamide in the form of lumps, pellets, or chips may be coated with the ingredients and the polyamide then melted. The preferred embodiment for the incorporation during polymerization is the addition of the phenolic antioxidant and hypophosphite just prior to discharge of the polyamide after the polycondensation is completed with enough time allowed for uniform distribution of the stabilizers throughout the melt.

Listed below are illustrative examples of the hindered phenolic derivatives of the general type described which can be effectively employed with a metal hypophosphite to act as antioxidants for the purpose of the present invention:

1,6-bis[3-(3,5-di-t-butyl-4-hydroxyphenyl)propionamido]-hexane,
1,2-bis[3-(3,5-di-t-butyl-4-hydroxyphenyl)propionamido]-ethane,
1,4-bis[3-(3,5-di-t-butyl-hydroxyphenyl)propionamidomethyl]cyclohexane,
N,N'-bis[3-(3,5-di-t-butyl-4-hydroxyphenyl)propionyl]-piperazine,
1,6-bis[3-(3-methyl-4-hydroxy-5-t-butylphenyl)propionamido]-hexane,
1,2-bis[3-(3-methyl-4-hydroxy-5-t-butylphenyl)propionamido]-ethane,
N,N'-bis[3,5-di-t-butyl-4-hydroxybenzyl]adipamide,
Bis[N-(3,5-di-t-butyl-4-hydroxybenzyl)propionamide]-sulfide,
1,6-bis[3-(3,5-dimethyl-4-hydroxyphenyl)propionamido]-hexane,
1,6-bis[3-(3,5-dimethyl-4-hydroxyphenyl)propionamido]-hexane,
N,N'-bis(3-methyl-4-hydroxy-5-t-butylbenzyl)adipamide.

The hindered phenolic compounds of this invention, having the formula I above, can be prepared via a number of conventional amidation procedures. Thus, an acid of the formula

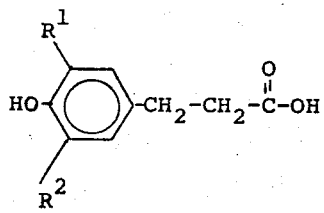

III wherein $R^1$ and $R^2$ are as defined above or an alkyl ester thereof and a polyamine are heated in an inert solvent with the generation of water or an alcohol. Alternatively, the polyamine and the acid halide of the compound of formula III, generally the acid chloride are allowed to react in an inert solvent, preferably in the presence of an organic or inorganic base which serves as an acid binding agent. The preparation of these compounds are explained in further detail in Belgian Pat. No. 726,092, issued June 27, 1969.

The hindered phenolic compounds of formula II can be prepared through the condensation of an alkyl hydroxybenzyl alcohol and a dinitrile in the presence of an acid catalyst such as mineral acids. Generally the nitrile can be employed as the reaction medium as well as an inert organic solvent.

Alternatively, conventional methods of amide preparation such as the reaction of an alkylhydroxybenzylamine and an alkanoic acid chloride are employed.

In the case wherein the group "Y" of formula II is "$—CH_2—CH_2—S—CH_2—CH_2—$," these compounds are prepared by reacting an alkylhydroxybenzyl alcohol with acrylonitrile. The corresponding N-(alkylhydroxybenzyl)acrylamide is reacted with hydrogen sulfide which results in the coupling of two molecules of the acrylamide across the thio linkage, thus yielding a bis[N-(alkylhydroxybenzyl)propionamide]-sulfide. The preparation of the compounds of formula II are explained in more detail in Canadian Pat. No. 812,262, issued May 6, 1969.

The amount of metal hypophosphite incorporated into the polyamide may fall within the range of from 0.01 to 0.25 percent by weight of the polyamide but preferably within the range of from 0.05 to 0.15 weight percent. The amount of hindered phenolic compound is within the range of 0.01 to 5 percent by weight of the polyamide but is perferably withing the range of 0.1 to 2 weight percent. In the preferred embodiment of the invention, the polyamide also contains a conventional delustrant such as titanium dioxide, ultraviolet light absorbers such as manganese compounds, and coloring materials such as dyes and pigments.

The addition of small amounts of finely divided copper and potassium iodide have also been found advantageous in increasing the stability of polyamides when used in conjunction with the hindered phenolic antioxidant and the metal phosphite.

The following examples will serve to further illustrate the nature of this invention which should not be construed as a limitation thereof.

EXAMPLE 1

To 39.3 g (0.15 moles) of hexamethylenediammonium adipate were added 0.177 g (7.5 × $10^{-4}$ mole; 0.5 mole %) of hexamethylenediammonium diacetate as molecular weight control agent, 0.183 g (0.5% of theoretical nylon yield) of 1,3-bis[3-(3,5-di-t-butyl-hydroxyphenyl)propionamido]ethane and 0.0366 g (0.1% of theoretical nylon yield) of sodium hypophosphite. The mixture was mixed thoroughly and added to a Pyrex polymer tube.

The polymer tube was evacuated three times and filled with High Purity nitrogen each time. The polymer tube with a continuously maintained, slightly positive nitrogen pressure was placed in a methyl salicylate vapor bath at 222°C. The nylon-6,6 salt melted with bubbling due to the liberation of water. After the bubbling ceased, a clear melt was obtained which solidified after 5–8 minutes. After 1 hour at 222°C the polymer tube was transferred to an o-phenyl-phenol bath at 285°C for 1 hour where the solid gradually remelted. The polymer tube was kept in the 285°C vapor bath for an additional ½ hour while it was maintained under oil pump vacuum (<1mm.). High purity nitrogen was then readmitted and the polymer tube was allowed to cool.

EXAMPLE 2

The plug of nylon-6,6 obtained in Example 1, was ground in a Wiley mill at ambient temperature. About 2 g were heated in small glass Petri dish in a circulating air, rotary oven at 140°C for 65 hours. The viscosity of a 1% sulfuric acid solution of aged and unaged polymer samples were determined at 25°C. Stabilizer effectiveness was judged by the percent retention of specific viscosity and by color formation after oven aging. A polyamide containing no stabilizers was prepared and tested in a similar manner and their results with respect to the percent retention of specific viscosity is compared in the following Table I. The stabilized polyamide had better color retention than the unstabilized polyamide after oven aging.

TABLE I

| Polyamide | Specific Viscosity | |
|---|---|---|
| | Initial | % Retention |
| Unstabilized | 1.64 | 57 |
| Stabilized | 1.62 | 96 |

EXAMPLE 3

Pellets (500 g) of unstabilized nylon-6,6 (Zytel 101, DuPont) were placed in a Kitchen Aid Mixer. With mixing a solution of 2.5 g (0.5%) of 1,2-bis[3-(3,5-di-t-butyl-hydroxyphenyl)-priopionamide]ethane in 20 ml. of methylene chloride was added slowly. Sodium hypophosphite (0.5 gm, 0.1%) was dissolved in 20 ml of water and added slowly with mixing to the nylon pellets after the antioxidant solution had been added and most of the methylene chloride had evaporated. The stabilized pellets were dried at 80°C at <1mm. for 4 hours.

The polyamide formulation was extruded at 600°F. through a ¼ inch die into a rod which was water cooled and chopped into pellets. A ¾ inch Brabender extruder, equipped with a nylon screw, was used. The pellets were dried at 80° at <1mm. for 4 hours.

The dried pellets were pressed into 5 × 5 × 0.005 inch films at 290° and 350 psi for 3 min. The mold was transferred quickly to a water-cooled press and maintained at 350 psi, for 2–3 mins.

Samples (2.2g) of compression molded nylon-6,6 films were aged in an air circulating, rotary oven at 150°C for various time periods. Stabilizer performances were assessed by measurements of specific viscosity retention of oven aged samples in 11% formic acid solution. The time to 50% retention of the specific viscosity is reported in Table II below:

TABLE II

| % Hindered Phenol | %NaH₂PO₂ | Hrs. to 50% Retention of Specific Viscosity |
|---|---|---|
| 0.5 | None | 200 |
| 0.5 | 0.1 | 384 |

EXAMPLE 4

A two liter autoclave, equipped with a paddle stirrer, thermocouple well, bottom outlet valve, jacket for circulating heat transfer fluid from an external heated reservoir, and valved outlets and inlets, was used for the polymerizations.

Nylon-6,6 salt, (800 g; Dow Badische) was dissolved in 480 ml of warm distilled water. Hexamethylenediammonium diacetate (2.69 g) was added as a molecular weight control agent. The solution was added to the autoclave, which was evacuated three times and filled with High Purity nitrogen. Nitrogen at 80 psi was left on the reactor. The polymerization was carried out over a period of 4 hours with mixiumum temperature and pressure reaching 280°C and 250 psi respectively.

The molten polymer issued froom the reactor bottom outlet through a heated 3/16 inch circular die. The extrudate was passed through a nitrogen atmosphere into a cold water bath. From the cold water bath the solid rod was passed into a pelletizer. The pellets were dried under oil pump vacuum at 80° for 4 hours.

The antioxidants (3.45 g; 0.5%) and 0.69 g of sodium hypophosphite (0.1%), were dispersed in 45 g of water with the aid of Tritan X-100, a dispersing agent. Sodium hypophosphite was soluble in water but the antioxidants were not soluble.

When added at the beginning of a polymerization the stabilizer dispersion was charged to the autoclave along with the nylon-6,6 salt solution. When added midway during a polymerization the stabilizer dispersion was transferred to a small pressure vessel which was pressurized then to 400–500 psi with High Purity nitrogen. The pressure vessel was attached to the autoclave and at the appropriate time, the dispersion was transferred by opening a valve between the autoclave and the pressurized storage vessel. When added as a dry mixture, i.e., 0.5% antioxidant and 0.1% sodium hypophosphite, near the end of the polymerization the stabilizers were added through a solid charging port while a stream of nitrogen from within the autoclave kept air from entering.

The samples were fabricated and tested using the same procedures as described in Example 3 except that the percent retention of the specific viscosity of the samples was determined after 48 hours at 150°C. The results are reported below in Table III.

EXAMPLE 5

Following the procedure of Example 1 but using 0.5% of N,N'-bis[3,5-di-t-butyl-4-hydroxybenzyl-]adipamide and 0.1% sodium hypophosphite, a stabilized polyamide composition is obtained which shows considerably less color developemnt and substantially less weight loss after aging at 140°C for 65 hours than a polyamide which is unstabilized.

EXAMPLE 6

Following the procedure of Example 1, but using 0.5% of 1,6-bis[3,(3-methyl-4-hydroxy-5-t-butylphenyl)propionamido]-hexane and 0.1% potassium hypophosphite, a stabilized polyamide composition is obtained which shows considerably less color development and substantially less weight loss after aging at 140°C for 65 hours than a polyamide which is unstabilized.

Polyamide compositions are prepared and stabilized in a similar manner as above with the following stabilizer combinations and show the same superior results over the unstabilized polyamide:

a. 0.5% N,N'-bis(3,5-di-isopropyl-4-hydroxybenzyl)-adipamide and 0.1% potassium hypophosphite b. 0.5% bis[n-(3,5-di-t-butyl-4-hydroxybenzyl)-propionamide]sulfide and 0.1% sodium hypophosphite c. N,N'-bis[3-(3,5-di-t-butyl-4-hydroxyphenyl)-propionyl]piperazine and 0.1% sodium hypophosphite.

What is claimed is:

1. A synthetic polyamide composition stabilized against oxidative and thermal deterioration which comprises a polyamide having recurring amide groups as integral parts of the main polymer chain, from about 0.01 to about 0.25 weight percent of a metal hypophosphite, wherein said metal is selected from the groups Ia, IIa or IIb of the periodic table, and from about 0.01 to about 5 weight percent of a hindered phenolic compound having the formula:

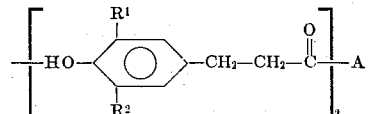

wherein $R^1$ and $R^2$ are lower alkyl of from 1 to 6 carbon atoms and

A is selected from the group consisting of

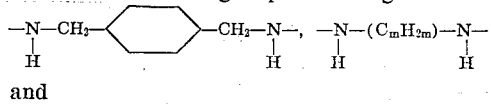

and

TABLE III

Performance of Phenolic Antioxidants and Sodium Hypophosphite in Autoclave Polymerized Nylon-6,6

| Antioxidant[a] (0.5%) | %NaH₂PO₂ | Time Stab.[b] Added | Form Stab. Added | % Retn specific viscosity After 48 hrs. at 150° |
|---|---|---|---|---|
| None | None | — | — | 20 |
| 1 | None | At start | Aq. Disp. | 36 |
| 1 | 0.1 | At start | Aq. Disp. | 62 |
| 1 | 0.1 | After 3½ hrs. | Aq. Disp. | 61 |
| 1 | 0.1 | After 5½ hrs. | Dry Powd. | 128 |
| 2 | 0.1 | After 5½ hrs. | Dry Powd. | 97 |

[a] Antioxidant represented by No. 1 is 1,2-bis[3-(3,5-di-t-butyl-hydroxyphenyl)propionamido]ethane.
Antioxidant represented by No. 2 is 1,2-bis[3-(3,5-di-t-butyl-hydroxyphenyl)propionamido]hexane.
[b] Polymer was discharged from Autoclave at 6 hrs.

where $m$ is a number from 2 to 8 and $-(C_mH_{2m})-$ is linear or cyclic, or

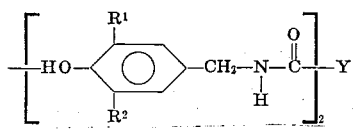

wherein $R^1$ and $R^2$ are as defined above and

Y is alkylene from 1 to 10 carbon or of $-C_2H_4-S-C_2H_4-$.

2. The composition of matter of claim 1 wherein the metal hypophosphite is sodium hypophosphite or potassium hypophosphite, wherein the concentration of said hypophosphite is in the range of about 0.05 to about 0.15 weight percent and the concentration of said phenolic antioxidant is in the range of about 0.05 to about 0.2 weight percent.

3. The composition of matter of claim 1 wherein the hindered phenolic compound is 1,6-bis[3-(3,5-di-t-butyl-4-hydroxyphenyl)propionamido]hexane.

4. The composition of matter of claim 1 wherein the hindered phenolic compound is 1,2-bis[3-(3,5-di-t-butyl-4-hydroxyphenyl)-propionamido]ethane.

5. The composition of matter of claim 1 wherein the hindered phenolic compound is 1,4-bis[3-(3,5-di-t-butyl-4-hydroxyphenyl)-propionamidomethyl]cyclohexane.

6. The composition of matter of claim 1 wherein the hindered phenolic compound is N,N'-bis[3-(3,5-di-t-butyl-4-hydroxyphenyl)propionyl]piperazine.

7. The composition of matter of claim 1 wherein the hindered phenolic compound is 1,6-bis[3-(3-methyl-4-hydroxy-5-t-butylphenyl)-propionamido]hexane.

8. The composition of matter of claim 1 wherein the hindered phenolic compound is 1,2-bis[3-methyl-4-hydroxy-5-t-butylphenyl)-propionamido]ethane.

9. The compositions of matter of claim 1 wherein the hindered phenolic compound is N,N'-bis(3,5-di-t-butyl-4-hydroxybenzyl)adipamide.

10. The composition of matter of claim 1 wherein the hindered phenolic compound is bis[N-(3,5-di-t-butyl-4-hydroxybenzyl)propionamide]sulfide.

* * * * *